United States Patent [19]
Wittmann

[11] 3,743,764
[45] July 3, 1973

[54] ELECTRONIC PHASE SHIFTING APPARATUS

[75] Inventor: Erwin Johann Wittmann, North Plainfield, N.J.

[73] Assignee: RCA Corporation, New York, N.Y.

[22] Filed: May 18, 1972

[21] Appl. No.: 254,636

[52] U.S. Cl. ........... 178/5.4 HE, 307/232, 328/155, 330/30 D
[51] Int. Cl. .............................................. H04n 9/46
[58] Field of Search ................. 178/5.4 HE, 5.4 AL, 178/5.4 SY, 5.4 SD, 69.5 LB; 307/232, 262, 295; 321/51–54; 325/65; 328/133, 134, 155; 330/30 D; 333/17 R, 18

[56] References Cited

UNITED STATES PATENTS

| | | | |
|---|---|---|---|
| 3,378,790 | 4/1968 | Bray | 178/5.4 SY |
| 3,575,549 | 4/1971 | Hepner et al. | 178/5.4 HE |
| 3,585,285 | 6/1971 | Rennick | 178/5.4 SY |
| 3,597,639 | 8/1971 | Harwood | 328/1 SS |

*Primary Examiner*—Robert L. Griffin
*Assistant Examiner*—Richard D. Maxwell
*Attorney*—E. M. Whitacre, Kenneth R. Schaefer et al.

[57] ABSTRACT

An electronic phase shift circuit suitable for construction in integrated circuit form as a tint control or as an automatic frequency and phase control for a color oscillator, or the like.

In the phase shift circuit, input signals are coupled via two signal paths to a signal adding or summing circuit. Predetermined but different phase shifts are provided in the two signal paths. Additionally, one signal path includes a differential control circuit responsive to applied control signals for varying the amplitude of signals coupled through that path. The resultant phase of the sum of the signals with respect to the phase of the input signals is variable according to the magnitude of applied control signals.

11 Claims, 1 Drawing Figure

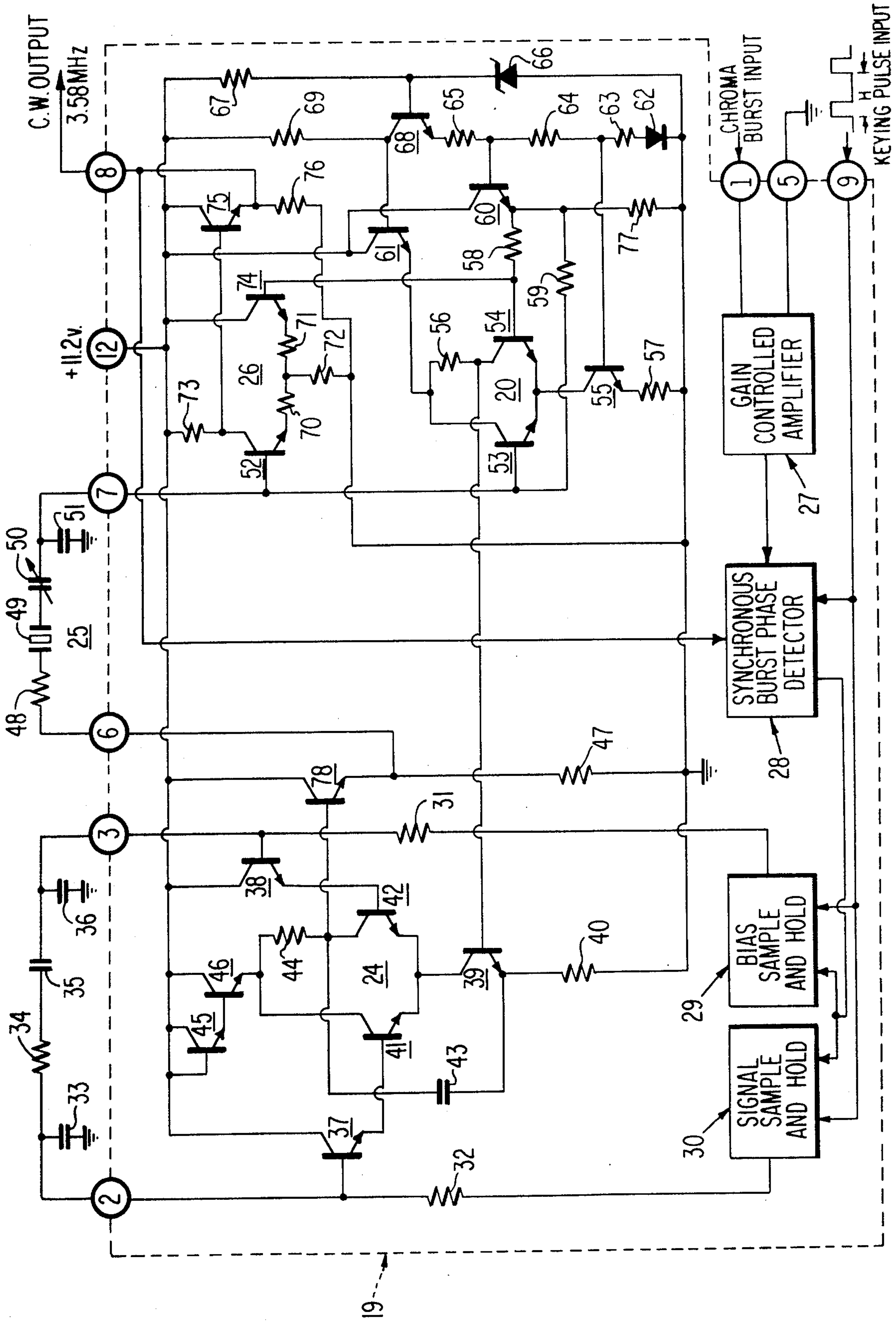
C.W. OUTPUT
3.58MHz
+11.2v.
CHROMA BURST INPUT
KEYING PULSE INPUT
H
GAIN CONTROLLED AMPLIFIER
SYNCHRONOUS BURST PHASE DETECTOR
BIAS SAMPLE AND HOLD
SIGNAL SAMPLE AND HOLD

ELECTRONIC PHASE SHIFTING APPARATUS

This invention relates to electronic phase shifting circuits and in particular to circuits of the type which may readily be constructed in monolithic integrated form, for use for example, in color television receivers.

This invention relates to electronic phase shifting circuits and in particular to circuits of the type which may readily be constructed in monolithic integrated form, for use for example, in color television receivers.

In many types of electronic control systems such as automatic frequency and phase control (AFPC) and electronic tint or hue control systems associated with the color reference oscillator found in color television receivers, a means of phase shifting electronic signals is required. For example, in such an AFPC circuit, the phase of an output of the color reference oscillator is compared periodically with the phase of a broadcast reference burst signal component. The resulting phase difference or error between the two signals is detected to produce an error voltage. The error voltage then may be applied to an electronic phase shifter causing the output of the reference oscillator to shift in phase until the error voltage becomes substantially zero.

Electronic phase shift circuitry may also be used in connection with a hue or tint control. Such a control is provided in a color television receiver to allow the viewer to vary the tint or hue of the display according to his own preference. Here, control may be accomplished by phjase shifting the color reference signal with respect to that of the color information, i.e., the chrominance signal component of the received signal, or vice versa.

The present trend in television receiver construction, as well as in other types of electronic equipment, is to house in an integrated circuit a relatively large number of functionally related electronic devices. This form of integrated packaging lends itself to simplicity in system construction as well as to cost savings by allowing the use of fewer discrete components and connections.

Practical considerations, however, determine whether or not it is advisable to build an individual circuit on an integrated circuit chip. When designing circuits for integrated construction it is desirable to restrict external connections (and therefore terminals) on the chip to a standard number, thus allowing many different individual circuit types to be housed in a standard package. Likewise, it is desirable to restrict power dissipation of each integrated circuit to a relatively constant level, thereby eliminating an internal voltage regulation problem due to changes in circuit current drain. If integrated capacitive elements are used in the circuit, it is desirable to maintain the quiescent voltage across such elements at a relatively constant amplitude in order to maintain a fixed value of capacitance.

In some previous approaches to the design of monolithic integrated phase shifting circuits (for example, U.S. Pat. No. 3,597,639, granted Aug. 3, 1971 in the name of Leopold A. Harwood), a relatively large number of active and passive elements were required.

In accordance with the present invention, electrically variable phase shifting apparatus is provided having no external components and a relatively few circuit elements. Such apparatus is arranged for relatively constant power dissipation, relatively constant voltage across included integrated capacitive elements, and relatively constant output signal amplitude over a range of phase angles. In addition, the circuit provides a differential means of coupling control signals to the phase shifter for purposes of eliminating DC level errors in associated phase controlling means.

These and other desired characteristics are accomplished by utilizing amplifying means having first, second and third terminals, wherein the first terminal is coupled to a source of signals, the phase of which is to be shifted. The amplifying means is arranged to provide output signals at the second terminal that are replicas of those applied to the first terminal and are of a first relative phase. Additional output signals are provided at the third terminal which are also replicas of those at the first terminal but are of different phase.

Current splitting means are coupled to the above-mentioned third terminal to divide signal currents from this terminal into two paths, one of which terminates in a resistive load element. Differential input terminals associated with the current splitting means are coupled to a control signal source, the control signals serving to vary the amount of signal current flowing into the resistive load element.

A reactance element is coupled from the second terminal of the amplifying means to the junction of the current splitting means and the resistine load element. At this junction, substantially fixed amplitude signal currents flowing through the reactance element add to the variable amplitude signal currents from the current splitting means, producing output signals with phase responsive to the control signals.

A better understanding of the present invention, its features, and objects can be obtained by referring to the drawing and description below.

FIG. 1 is a detailed schematic diagram, partially in block form of an automatic phase and frequency control system embodying the present invention.

Referring to FIG. 1, there is shown a diagram of a portion of an integrated circuit 19, the outline of which is indicated by a dashed line, encompassing the automatic frequency and phase control (AFPC) system for a color reference oscillator utilized in a color television receiver.

The illustrated color reference oscillator comprises a discrete set of frequency determining elements 25 coupled through an amplifier 20 and a phase shift circuit 24 in a closed-loop, positive feedback arrangement. The oscillator provides a continuous wave (cω) output which is coupled via a linear amplifier 26 to an output terminal 8. The frequency of the color reference oscillator is normally arranged, in accordance with the broadcast standards of a particular locality, to provide oscillations at a frequency equal to that of the suppressed subcarrier wave associated with the color or chroma signals. For example, in the United States, the frequency of the chroma subcarrier, and therefore the color oscillator frequency, is generally referred to as equal to 3.58 MHz.

The color reference oscillator includes a limiting amplifier 20, coupled to the frequency determining elements 25, for amplifying and limiting the 3.58 MHz. waveform to a value sufficient to sustain oscillations in the loop elements 20, 24, 25. Amplifier 20 comprises differentially configured transistors 53 and 54 supplied by a constant current circuit including a transistor 55 and a resistive element 57.

Operating current and operating voltage levels are supplied to amplifier 20 (as well as other portions of chip 19) by means of a regulated supply arrangement including the series arrangement of a resistor 67 and a zener diode 66 coupled between terminal 12 and a reference (ground) potential. Typically an external supply voltage of +11.2 volts is provided at terminal 12. The voltage across zener diode 66 (e.g. +5.6 volts) is coupled to the base of a transistor 68, the collector of which is coupled to terminal 12 by means of a resistor 69 and the emitter of which is coupled via the series combination of resistors 63, 64, 65 and a diode 62 to the reference potential terminal (ground). Resistor 63 and diode 62 are selected with respect to current source transistor 55 and resistor 57 to provide the desired operating current for differentially connected transistors 53 and 54.

Bias voltage (approximately 2 volts) necessary to maintain a desired quiescent level at the output of amplifier 20 is supplied to the bases of transistors 53 and 54 by means of a transistor 60 having a base coupled to the junction of resistors 64 and 65, an emitter coupled via a resistor 77 to ground and a collector coupled to terminal 12. Resistors 58 and 59 are coupled from the emitter of transistor 60 to the bases of transistors 54 and 53, respectively, to supply the bias voltage. Amplifier 20 derives its main operating supply voltage through a transistor 61, the base electrode of which is coupled directly to a supply voltage (approximately 8.2 volts) provided at the collector of transistor 68, and the emitter electrode of which is coupled to the collector electrode of transistor 53 so as to provide an operating collector voltage of approximately 7.5 volts.

A second amplifier 26 is designed to operate linearly and produce a replica of the output waveform derived from the frequency selective elements 25. Linear amplifier 26 comprises transistors 52 and 74 and resistive elements 70, 71, 72 and 73. Resistive elements 70 and 71 are connected to emitter electrodes of transistors 52 and 74, respectively, to provide degenerative feedback and thereby allow amplifier 26 to produce a linear output.

The base electrode of transistor 52 is direct coupled to the base electrode of transistor 53 and, in a similar manner, the base electrode of transistor 74 is direct coupled to the base electrode of transistor 54, thus providing means for supplying identical input signals to each of amplifiers 20 and 26.

Output from the linear amplifier 26 is coupled from the collector electrode of transistor 52 to the base electrode of a transistor 75 arranged in a common collector configuration as a current amplifier. A resistive element 76 is coupled between ground and the emitter of transistor 75. Continuous wave output signals are prduced at the emitter of transistor 75 (terminal 8) with sufficient amplitude to drive external output circuitry (not shown) and an associated synchronous burst phase detector 28.

The color reference oscillator is synchronized with respect to the color subcarrier wave by means of a color synchronizing burst component which is broadcast as part of the composite color television signal. This periodic train of burst information is applied, along with modulated color subcarrier components, to terminal 1 of the integrated circuit 19. The burst and subcarrier components are coupled through a gain controlled amplifier 27 to synchronous burst phase detector 28.

Keying pulses, produced at the television horizontal line scanning rate and normally coincident with the occurrence of burst information, are also applied via terminal 9 to the synchronous burst phase detector 28. These pulses allow the above-mentioned detector 28 to periodically compare the phase relation between the burst information and the CW output of the color reference oscillator 20, 24, 25, 26. Error signals representative of phase discrepancy are produced at the output of detector 28 and are coupled to a pair of sample and hold circuits 29, 30. Resulting outputs from sample and hold circuits 29 and 30 are coupled to the electronic phase shifting network 24.

Sample and hold circuits suitable for this application are described in U.S. Pat. application Ser. No. (RCA 64,810). Keying signals are applied to the sample and hold circuit 30 so as to couple phase error information from the synchronous burst phase detector 28 to a discrete, external capacitor 33 coupled between chip terminal 2 and ground.

The keying pulses also serve to activate the bias sample and hold circuit 29 so as to sample and store, across an external capacitor 36, a quiescent output voltage produced by synchronous burst phase detector 28. By keeping a constant account of both error and quiescent levels, the value of the sample can always be determined as the difference between these two levels. This technique assures accurate error reproduction over long term thermal drifts, and in particular, provides means for differential input to the phase shift circuitry 24.

The size of capacitor 33 is selected in correspondence with a resistor 32 to have a time constant commensurate with synchronization of the phase controlled oscillator 20, 24, 25, 26. In a similar manner, storage capacitor 36, coupled between terminal 3 and ground, and a resistor 31 are selected to provide a desired relationship between both signal and bias time constants. An anti-hunt (damping) network comprising a series combination of a resistor 34 and a large capacitor 35 (10 microfarads) is coupled between terminals 2 and 3. The anti-hunt network is not required for all types of detectors but is useful in the context of color oscillator control to reduce the effect of transient disturbances on the oscillator, particularly during the vertical retrace interval when burst information is absent.

The voltages across storage capacitors 33 and 36 are coupled to the phase shift circuitry 24 by means of transistor 37 and 38. Transistors 37 and 38 each are connected in common collector configuration, having their base electrodes coupled to capacitors 33 and 36, respectively, and their respective emitter electrodes direct coupled to base electrodes of differentially connected transistors 41 and 42. This arrangement provides a high impedance load to the storage capacitors 33, 36, while providing current gain to drive the differential amplifier 41, 42 of the phase shift network 24.

A transistor 39 and a resistine element 40 comprise a first amplifying means of the electronic phase shift network 24. Signals to be phase shifted are coupled from the collector electrode of transistor 54 to the base electrode of transistor 39. Output signals from this first amplifying means are derived at each of the emitter and collector electrodes of transistor 39.

Those signals generated at the emitter electrode of transistor 39 have substantially the same phase as the input signals applied to the base thereof and are utilized to drive the series combination of a capacitor 43 and a resistive load element 44. The collector electrode of transistor 39 is connected to the common emitter electrodes of transistor 41 and 42. These latter transistors are connected in a differential amplifier configuration and provide current splitting means to the signal fed to their common emitter electrodes. The base electrode of transistor 41 is direct coupled to the emitter electrode of driver transistor 37 which provides transistor 41 with a direct voltage proportional to the signal sample held on capacitor 33. Similarly, the base electrode of transistor 42 is direct coupled to the emitter of driver transistor 38, providing transistor 42 with a voltage level proportional to the bias sample held on capacitor 36. The difference between the voltages supplied to the base electrodes of transistors 41 and 42 determines the relative current flow in transistors 41, 42.

In the illustrated configuration, capacitor 43 is suitable for construction on chip 19 in the manner described in U.S. Pat. application, Ser. No. RCA 65,579. Integrated circuit capacitive elements of that type comprise semiconductor devices connected in a diode arrangement having a reverse biased junction. A limitation on the amount of bias voltage applied to the diode arrangement is determined by the reverse breakdown voltage of the junction. Therefore, in order to facilitate proper capacitive operation it is necessary that the maximum excursion of signal voltage plus bias voltage applied across the diode capacitance arrangement does not exceed this reverse breakdown voltage. To this end, the main supply voltage is coupled to the electronic phase shift network 24 by a series configuration of diode-connected transistors 45 and 46. The voltage provided at the emitter of transistor 46 is approximately 1.4 volts less than the voltage provided at terminal 12. This reduced operating voltage is provided for phase shift circuit 24 so that the voltage appearing across capacitive element 43 does not exceed the reverse bias maximum required for proper and reliable operation of capacitor 43.

Output signals produced across load resistance element 44 are coupled via an emitter follower transistor 78 and resistor 47 to the narrow-band frequency determining elements 25.

The frequency determining elements 25 comprise a resistor 48, a crystal 49, and a variable capacitance 50 in series configuration, and a capacitor 51 in shunt configuration. Each of these elements 48, 49, 50, 51 is a discrete component and is located external to the integrated circuit chip 19.

In the operation of the phase shifter 24, limited amplitude signals having a nominal fundamental frequency component of 3.58 MHz are supplied to the base electrode of transistor 39 from limiting amplifier 20. These signals appear at the emitter electrode of transistor 39 in approximately the same phase as signals at the base electrode of transistor 39 and are coupled via capacitor 43 to resistor 44. Typical values for capacitor 43 and resistor 44 are 15 pf and 2,000 ohms respectively. 3.58 MHz signal currents passing through this combination of elements 43, 44 are thereby phase shifted approximately +56°.

3.58 MHz signal currents are also coupled via a second path to resistor 44. The second path comprises the series-connected collector-emitter circuits of transistors 39 and 42. The collector current of transistor 39 is divided between transistors 41 and 42 according to the difference in voltages supplied to the bases of transistors 41 and 42.

The differential control voltage, as stated above, is provided by signal sample and hold and bias sample and hold circuits 29 and 30 and is representative of the phase error of the oscillator circuit as determined by synchronous detector 28. When the two inputs to phase detector 28 are in quadrature (90°) phase relationship, the resultant voltages across capacitors 33 and 36 will be equal (zero error). If the signal supplied to phase detector 28 from transistor 75 deviates from this relationship, the voltage across capacitor 33 wil increase or decrease depending upon the direction of the phase error of the oscillation compared to the received burst component. The change in voltage across capacitor 33 will cause transistor 41 to conduct more or less, respectively, and an opposite change in current in transistor 42 will result.

Signal currents flowing through resistive element 44, therefore, emanate from two separate sources, capacitive element 43 and transistor 42. The voltage across resistor 44, responsive to signal currents flowing therein, corresponds to the addition of vectors representing the signal currents. For reference purposes, signal currents are assumed to flow from the eollector electrode of transistor 42 through resistive element 44. Hence, the voltage across resistor 44 is representative of the effective vectoral addition of signal currets passing through the capacitor 43 and having a relative phase of approximately +56°, and signal currents having relative phase of approximately +213°, the amplitude of the latter components varying as a function of voltage difference between the base electrodes of transistors 41 and 42. Variable phase shift of signals is provided across resistor 44, as a function of the quantity of variable amplitude (+213° phase) signal currents added therein to fixed amplitude (+56° phase) signal currents.

For the condition where the voltage across capacitor 33 is at its maximum positive value, transistor 41 is conducting essentially all signal current flowing through the collector electrode of transistor 39 and transistor 42 is essentially cutoff. Under these conditions, total signal currents flowing through resistive element 44 are due to current flowing through capacitive element 43. Phase shifted output signals, across resistive element 44, responsive to the current flowing therein, therefore have a phase of approximately +56° with respect to the output of transistor 54.

For the condition where the voltage across capacitor 33 is at a minimum positive value less than that across capacitor 36, transistor 41 is essentially cutoff and transistor 42 is conducting essentially all signal current flowing in the collector electrode of transistor 39. Signal currents flowing through resistive element 44 therefore comprise the sum of signal currents from each of capacitive element 43 and the collector of transistor 42.

Signal currents at the collector electrode of transistor 39, having a reference current flow direction towards the emitter electrodes of transistors 41 and 42, are essentially +213° phase shifted from those at its base electrode. These signals are coupled to the resistive load element 44 through transistor 42 according to the voltage difference on the base electrodes of transistors 41 and 42 and in the same phase relationship.

Signal currents flowing through resistive element 44 from capacitive element 43 and transistor 42 are each similar in amplitude but different in phase relation (e.g., +56° and +213°). Addition of these signal currents takes place in resistive element 44 in a vectoral manner forming a single resultant signal current having a phase of approximately +180°. Output signals across resistive element 44, responsive to the current flowing therein, have a phase shift of +180° relative to the output of transistor 54.

Hence, by adjusting the base voltages on transistors 41 and 42 and thereby varying the amplitude of the +213° phase shifted signal, an output signal across resistive element 44 can be made to have any phase angle between these two extremes (i.e., +56° and +180°).

While the invention has been described in terms of a preferred embodiment and environment it will be apparent to persons skilled in the art of electronic circuit design that various modifications to the specific illustrated circuit arrangement may be made without departing from the invention.

What is claimed is:

1. Electronic phase shifting apparatus comprising:

a source of signals, amplifying means having first, second and third terminals, said first terminal being coupled to said source, said second terminal providing output signal replicas of signals coupled to said first terminal and at a first relative phase, said third terminal providing output signal replicas of signals at said first terminal and of substantially different phase from said signals at said second terminal, current splitting means coupled to said third terminal for dividing signal currents at said third terminal into two paths, said current splitting means including differential input terminals and at least one output terminal, a load impedance element coupled to said output terminal, a source of differential control signals means for coupling said differential control signals to said differential input terminals for controlling coupling of signal currents into said load impedance element;

and a reactance element coupled between said second terminal of said amplifying means and said output terminal of said current splitting means whereby, signal currents from said reactance element are added to variable amplitude signal currents from said current splitting means, producing signals with phase responsive to said differential control signals.

2. Electronic phase shifting apparatus according to claim 1 wherein:

said amplifying means comprises at least one transistor having base, emitter and collector electrodes, corresponding to said first, second and third terminals respectively, said amplifying means providing at said emitter and collector electrodes replicas of signals supplied to said base electrode.

3. Electronic phase shifting apparatus according to claim 2 wherein:

said current splitting means comprises at least first and second transistors each having emitter, base and collector electrodes, a common connection of said emitter electrodes, means coupling said common connection to said collector electrode of said amplifying means and thereby providing signals to said current splitting means, said load impedance element comprises a resistance coupled to said collector of said second transistor, and said source of differential control signals is coupled to said base electrodes of said first and second transistors for controlling the signal currents into said resistive load element.

4. Electronic phase shifting apparatus according to claim 3 wherein:

said reactance element is a capacitive device having first and second terminals, said first terminal being coupled to said emitter electrode of said amplifying means, said second terminal being coupled to said collector electrode of said second transistor of said current splitting means.

5. Electronic phase shifting apparatus according to claim 4 wherein:

said source of signals corresponds to a color reference oscillator providing continuous waves at a frequency corresponding to the color subcarrier component of a color television signal.

6. Electronic phase shifting apparatus according to claim 5 wherein:

said source of differential control signals comprises a source of signals responsive to a phase difference between signals supplied to said amplifying means and a periodic burst signal component of a composite color television signal.

7. Electronic phase shifting apparatus according to claim 1 wherein:

said current splitting means comprises at least first and second transistors each having emitter, base and collector electrodes, a common connection of said emitter electrodes, means coupling said common connection to said third terminal of said amplifying means and thereby providing signals to said current splitting means, said load impedance element comprises a resistance coupled to said collector of said second transistor, said source of differential control signals is coupled to said base electrode of at least one of said first and second transistors for controlling the signal current into said resistive load element.

8. Electronic phase shifting apparatus according to claim 7 wherein:

said reactance element is a capacitive device having first and second terminals, said first terminal being coupled to said second terminal of said amplifying means, said second terminal being coupled to said collector electrode of said second transistor of said current splitting means.

9. Electronic phase shifting apparatus according to claim 8 wherein:

said source of differential control signals comprises a source of signals responsive to a phase difference between signals supplied to said amplifying means and a periodic burst signal component of a composite color television signal.

10. Electronic phase shifting apparatus according to claim 1 wherein:

said reactance element is a capacitive device having first and second terminals, said first terminal being coupled to said second terminal of said amplifying means, said second terminal being coupled to said output terminal of said current splitting means.

11. Electronic phase shifting apparatus according to claim 2 wherein:

said amplifying means comprises a transistor having emitter, base and collector electrodes, a resistive element coupled between said emitter electrode and a source of reference potential, whereby output signals of a first relevant phase are produced at the junctin of said emitter electrode and said resistive element.

* * * * *

UNITED STATES PATENT OFFICE
CERTIFICATE OF CORRECTION

Patent No. 3,743,764 Dated July 3, 1973

Inventor(s) Erwin Johann Wittmann

It is certified that error appears in the above-identified patent and that said Letters Patent are hereby corrected as shown below:

Column 1, lines 7-10, delete the second occurrence of that portion reading "This invention relates to ... for use for example, in color television receivers."; line 30, "phjase" should read -- phase --. Column 2, line 25, "resistine" should read -- resistive --. Column 3, line 54, "prduced" should read -- produced --. Column 4, lines 15-16, "(RCA 64,810)" should read -- Serial No. 242,321 which issued as U.S. Patent No. 3,740,456 --; line 58, "resistine" should read -- resistive --. Column 5, line 20, "RCA 65,579" should read -- Serial No. 234,896, now abandoned --. Column 6, line 26, "eollector" should read -- collector --; line 29, "currets" should read -- currents --. Column 10, line 3, "junctin" should read -- junction --.

Signed and sealed this 17th day of September 1974.

(SEAL)
Attest:

McCOY M. GIBSON JR.
Attesting Officer

C. MARSHALL DANN
Commissioner of Patents